United States Patent
Vining et al.

(10) Patent No.: US 7,152,075 B2
(45) Date of Patent: Dec. 19, 2006

(54) SYSTEM AND METHOD FOR REMOVING RULES FROM A DATA ADMINISTRATION SYSTEM

(75) Inventors: Bonnie Jean Vining, Tucson, AZ (US); Kenneth Eugene Hannigan, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 10/036,609

(22) Filed: Dec. 21, 2001

(65) Prior Publication Data

US 2003/0120663 A1    Jun. 26, 2003

(51) Int. Cl.
 *G06F 17/00* (2006.01)
(52) U.S. Cl. ..................... 707/104.1; 706/47
(58) Field of Classification Search ............... 707/100, 707/102, 104.1
 See application file for complete search history.

(56) References Cited

U.S. PATENT DOCUMENTS

| | | | |
|---|---|---|---|
| 5,329,612 A | 7/1994 | Kakazu et al. | |
| 5,592,590 A | 1/1997 | Jolly | |
| 5,897,627 A | 4/1999 | Leivian | |
| 5,943,667 A | 8/1999 | Aggarwal et al. | |
| 6,104,835 A * | 8/2000 | Han | 382/225 |
| 6,246,787 B1 * | 6/2001 | Hennessey et al. | 382/141 |
| 6,483,938 B1 * | 11/2002 | Hennessey et al. | 382/149 |
| 6,484,171 B1 * | 11/2002 | Corl et al. | 707/7 |
| 6,725,428 B1 * | 4/2004 | Pareschi et al. | 715/530 |
| 2002/0042755 A1 * | 4/2002 | Kumar et al. | 705/26 |
| 2002/0049961 A1 * | 4/2002 | Fang et al. | 717/127 |
| 2003/0014466 A1 * | 1/2003 | Berger et al. | 709/102 |
| 2003/0023593 A1 * | 1/2003 | Schmidt | 707/6 |

\* cited by examiner

*Primary Examiner*—Uyen Le
(74) *Attorney, Agent, or Firm*—Timothy N. Ellis (57) ABSTRACT

Rule removal from a data administration system occurs where new rules entered into the system encompass existing rules already in the system. Parameters of existing rules and new rules are compared to determine if any parameters of new rules encompass parameters of existing rules. If so, the existing rule is removed to optimize system performance by reducing process times and minimizing space required to store rules.

55 Claims, 3 Drawing Sheets

SYSTEM AND METHOD FOR REMOVING RULES FROM A DATA ADMINISTRATION SYSTEM

BACKGROUND OF THE INVENTION

1. Field of the Invention

The present invention is directed to data administration systems. The invention specifically relates to systems and methods for removing rules from a data administration system.

2. General Background and State of the Art

Storage management systems such as the Tivoli Storage Manager (TSM) of International Business Machines, Inc. (IBM®) are designed to provide backup, archive, and space management services to remotely located clients. IBM® is a registered trademark of International Business Machines, Inc. Systems like the TSM system provide a server coupled to multiple clients, including multivendor platforms, personal computers, and local area network (LAN) file servers. An administrative interface allows administrators to control and monitor server activities, define management policies for client files, and set up schedules to provide services at regular intervals. Administrative functions could be available from an administrative client command line or a web browser interface. It is the administrator's job to control and monitor the server's activities, ensure that the system is running smoothly and at its optimum performance, and therefore make customizations to the system in order to improve its performance, reliability, speed, etc.

One important aspect of administering a storage management system is ensuring that events are handled and logged properly. Events are defined as an occurrence or happening, which are usually significant to the performance of a function, operation, or task. In the TSM system, an event takes the form of a message that originates on a client and is sent to the server, where it is the server's job to determine what to do with that event. Similarly, events may originate from within the server as well. Examples of event messages sent to the server in the TSM system include when client sessions start or end, when migration starts and ends, when backup versions expire, what data is exported to tape, and any errors that may occur. It is important to monitor the record of activity or events that occur in a large networked computer system. Often, having accurate records of the events leading up to a particular situation can assist in fixing problems when they arise. Therefore, accurate and efficient event logging is an important step in successfully managing a large data administration system.

Figure 1:
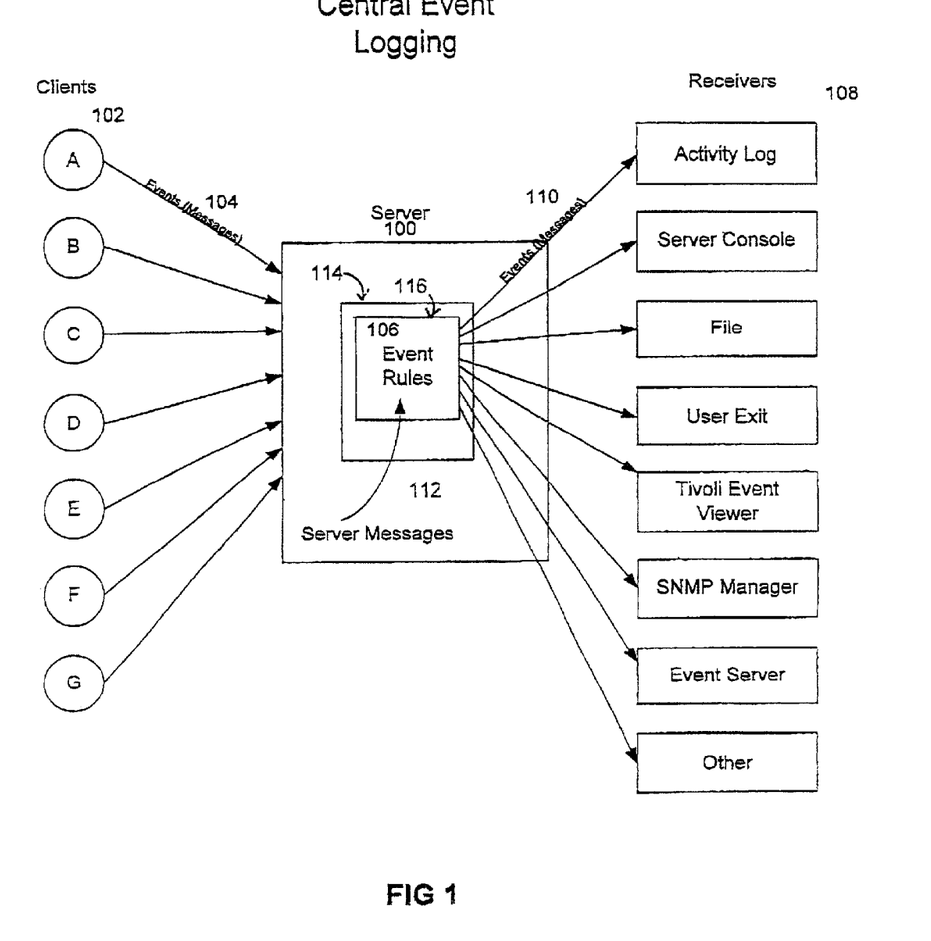
FIG. 1 is a schematic showing the path of events in a system such as the Tivoli Storage Manager.

FIG. 1 illustrates event logging in a typical storage management environment. A number of clients 102 are shown connected via a network to a server 100. Clients send event messages 104 through the network to the server 100 where event rules 106 are kept in a table 116 in the database 114, and used to direct events to the proper receivers 108. Just like rules govern many aspects of our own lives, the server determines how to handle events by reading rules from its database, which give instructions as to how to deal with a particular event. In order to modify the way events are handled, new rules are typically introduced to handle new events in the system. The administrator enters commands into the system through an administrative interface. These commands are then translated into new rules and added to a table in the database. Problems occur, however, when commands are issued resulting in rules that repeat the actions or functions of other already existing rules. Similarly, new rules may be introduced which contradict already existing rules in the database. The tables in the database where rules are stored continuously grow larger with each rule that is added, and unnecessarily, when new rules are added that effectively duplicate already existing rules. Large database tables use more disk space and increase the processing time required to scan the table and apply the rules. Therefore, an increase in the number of rules results in longer application processing times and places an added burden on the system's resources. With a large storage management system, the number of rules can become quite large, thus it would be beneficial if a method for removing rules which are encompassed by other rules in the system could be created to result in increased processing speed. A rule "encompasses" another rule if it is either the same rule, it is a superclass that contains the other rule in its subclass, or it is wildcarded in such a way that the wildcard, if expanded, would include the other rule.

There are several existing techniques known in the prior art which are directed at attempting to reduce the size of rules tables for enhancing the performance of database systems. One such prior art technique identifies and eliminates simple and strict redundancies by locating rules from which the new redundant rules have been derived. These ancestral rules form a compact rule set encompassing dependent rules having common elements. The dependent rules still exist, but only the compact rule sets are utilized. As a result, large rule sets containing such redundancies are not used by the data administration systems unless the ancestral rules are required for non-redundant characteristics. This known rule reducing technique, while able to reduce the size of the rules table used at any given time, still does not provide a successful technique for removing rules from such systems and for enhancing the performance of such systems.

In another prior art rules reducing technique, any two rules meeting certain computational criteria are compared for elements that correspond or are common to each rule. Any elements that so correspond are exchanged between the two rules, generating two new rules. While consolidating the number of rules elements, this technique actually increases the overall number of rules in the database, thereby producing lengthy processing times, which is yet again undesirable. Thus there are still problems with inefficiency in these prior art techniques. Furthermore, rule reducing techniques such as these are not directed towards rules based on specific commands entered by an administrator or user of a storage management system.

Therefore a need remains in the art for methods and associated systems for removing redundant rules from a data administration system that are encompassed by newly added rules in order to optimize system performance characteristics and to effectively decrease system storage requirements. Accordingly, one of the objectives of the present invention is to provide a system and method for removing redundant rules from a database of already existing rules at the time that a new rule is added.

INVENTION SUMMARY

These and other objects are achieved by the systems and methods of the present invention. The objects, features, and advantages of the present invention will be apparent to those skilled in the art from the following detailed description of the exemplary embodiments thereof, which makes reference to the appended Figures.

The present invention satisfies compelling needs in the art by removing redundant rules from a database or database in a data administration system. When a new rule resulting from an administrative command is added, a compare unit is started to eliminate existing rules that are already encompassed by the new rule. This compare unit may be implemented by hardware and/or software, which are capable of performing the compare unit functions. As mentioned before, a rule "encompasses" another rule if it is either the same rule, it is a superclass that contains the other rule in its subclass, or it is wildcarded in such a way that the wildcard, if expanded, would include the other rule. In the preferred embodiment, a background thread is initiated by the computer to carry out the functions of the compare unit. This is useful since continued processing of other administrative commands in the foreground is allowed while the thread "prunes" the database. However, the invention may also be implemented without the use of a background thread. For example, alternative embodiments might include waiting until rules cleanup is complete before allowing the administrator to enter additional commands, or also by recording all the newly added rules for comparison at a later time, perhaps at night to perform the cleanup during offpeak hours.

Each rule in the database is made up of a plurality of parameters which define it. The parameters of the new rule are passed to the compare unit. The compare unit then references the first existing rule in the database for comparison with the newly added rule. The parameters of this existing rule are read into the compare unit. First, a comparison for precedence is made. Generally, the first parameter of each rule is a timestamp which indicates what time the rule was entered into the system. The compare unit checks to see if the timestamp on the rule that already exists in the database is earlier than that of the new rule. If for some reason the existing timestamp is not earlier than the timestamp assigned to the newly added rule, the compare unit stops and logs an event indicating that a database inconsistency was found.

It is assumed that rules already existing in the database have a timestamp that is earlier than the rule being added. Otherwise, the rule being added is not considered "new", or alternatively there may be an error with rules in the existing rules table that should be examined. Therefore, if the timestamp of the existing rule is earlier than that of the timestamp of the given rule, the existing rule is considered a candidate for removal, and the compare unit continues the comparison process. Next, each parameter of the existing rule is checked to determine if it is still a candidate for removal. The compare unit iterates a comparison process between each parameter of the existing rule and new rule. If each parameter of the new rule encompasses or matches the parameter of the current rule in the table, the existing rule is then removed from the table. The compare unit can be defined to compare parameters by exact match, but more importantly it can be defined to recognize whether or not one parameter is within the scope of another parameter. A first parameter is within the scope of a second parameter if the two parameters are the same, if the second parameter is a superclass that contains the first parameter in its subclass, or the second parameter is wildcarded in such a way that the wildcard, if expanded, would include the first parameter.

There are many ways in which a rule may be eliminated. Rules may actually be removed by deleting the entry from the table in the database. In another embodiment, a flag is added to the existing rule indicating that it has been disabled. A rule with a flag will indicate that such a rule should be skipped and therefore not consulted when a query is performed. In another embodiment, an existing rule that has been removed may be taken from one rules table and placed in another rules table. In this case, the second rules table would not be considered in the normal operation of the management system. In still another embodiment, a list of removed existing rules may be created. Such a list would preserve all existing rules that have been disabled.

In accordance with the teachings of the present invention, rules are removed by comparing the parameters which define the rules, first considering order of precedence since newer rules should supercede older rules, and then by determining if parameters are equivalent or encompass one another. The compare unit may also use other methods to determine the precedence. For example, rules added by a supervisor may take precedence over rules added by a subordinate. An example of an applicable data administration system and database for which the invention can be used is the TSM system, and the databases contained within, however, the present invention is applicable to any type of data administration system or database.

The foregoing and other objects, features, and advantages of the present invention will become apparent from a reading of the following detailed description of exemplary embodiments, which illustrate the features and advantages of the invention in conjunction with references to the accompanying drawings.

DETAILED DESCRIPTION OF THE PREFERRED EMBODIMENTS

Figure 2:
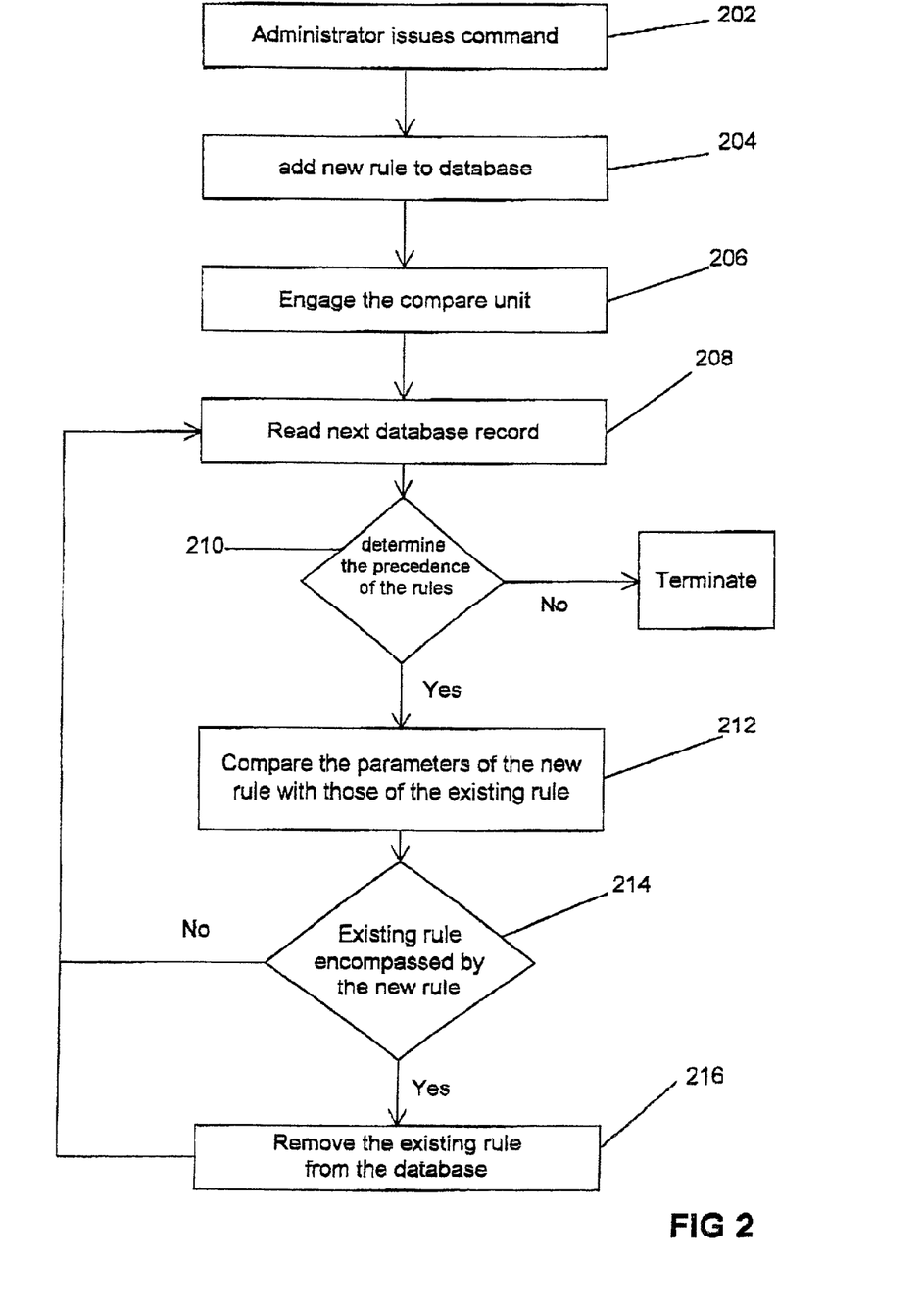
FIG. 2 is a flowchart showing the steps involved in removing rules from data administration systems.

Referring more particularly to the drawings, an exemplary method for removing redundant rules from a data administration system in accordance with the teachings of the present invention is illustrated in the following detailed description of the preferred embodiments and the attached figures. For purposes of explanation and without limiting the scope of the present invention, FIG. 2 illustrates a flowchart to demonstrate the unique features of the present invention in a simple context. For added understanding of the invention, FIG. 1 is included to illustrate event logging as it is used in a storage management system. Alternative functions are contemplated as being within the scope of the present invention as will be understood by those skilled in the art. For example, those skilled in the art will also appreciate that the method claimed may not only be used upon the addition of a new rule, but could be used at any time for maintenance purposes.

FIG. 1 illustrates event logging in a storage management environment. Messages 104 sent from the clients 102 to the server 100, and from within said server 100, provide a record of activity that the administrator may use to monitor the server. Server messages 112 and client messages 104 can be logged as events to one or more repositories called receivers 108. Event rules 106 which determine which receivers are to accept messages are stored in the database 114. Shown is the storage manager server 100; with a plurality of clients 102 (A–G) which are connected to server 100 and sending messages 104 to server 100. These messages must be handled by event rules 106, which are stored in the database 114. The event rules are a result of commands entered by the administrator into the system and instruct the server how to handle event messages, or to which receiver they should be sent. Once the rules are properly read, event messages 110 are sent to the proper receiver 108. Examples of receivers may be threads, applications, different hardware locations, etc.

The server allows logging of events to a number of the following receivers, including those shown in FIG. 1. Events can be sent to the server console and activity log, which normally begins automatically at server startup, however customizations may be desired. The administrator can also log events to a file exit or a user exit. A file exit is a single file that receives all the information related to its enabled events. The administrator should be aware that this file can rapidly grow in size depending on the events enabled for it. A user exit is an external interface in the form of an executable, user-written program. The administrator can also use simple network management protocol (SNMP) together with event logging to do things such as regularly check that the server is running, send traps to an SNMP manager, or run scripts and retrieve output and return codes. Events may be sent to the Windows event log which displays enabled events in the Windows Application Log in the Windows Event Viewer. The information displayed includes the date and time that the Windows Event Log received the event, category of the event, event number, user security identifier, and the name of the computer that logged the event, and event server receiver (Enterprise Event Logging). Also useful is that one or more servers can send server events and events from their own clients to another server for logging. The data administration system provides a receiver at the sending server that receives the enabled events and routes them to a designated event server. At the event server, an administrator can enable one or more receivers for the events being routed from other servers.

FIG. 1 shows possible configurations in which both server and client messages are filtered by the event rules and logged to a set of specified receivers. Events can be filtered by type for logging. For example, you might enable only severe messages to the event server receiver. Specific events can also be filtered, for example, by number to another receiver. Logging of events can be enabled or disabled to specific receivers. For example, at server start-up event logging begins automatically to the server console and activity log and for any receivers that are started based on entries in the server options file. When you enable or disable events, you can specify the following: a message number, an event severity, or events for one or more client nodes. For example, in a TSM system, to enable event logging to a user exit for server messages with a severity of WARNING, the administrator would enter the command:

enable events user exit warning

Rules in the data administration system are defined by a set of parameters. In the example above, "events", "user exit", and "warning" are all parameter values. Parameters correspond to columns in the rules table. Commonly used parameters include node name, domain name, a timestamp, receiver name, and event name or type, however one skilled in the art will appreciate that parameters are not limited to only those mentioned. Parameters may have a singular value, multiple values, or be a wildcard, meaning it may have any value. For example, a parameter for domain name may be defined as a single domain "domain.xxx.com". Alternatively, a rule may include actions for several domains, and the parameter for domain name would be defined as "domain1.xxx.com, domain2.xxx.com, domain3.xxx.com". In this example, the list of values are separated by commas, but also may include other common methods such as separation by spaces, colons, carriage returns, etc. Parameters could also be defined with multiple values by defining a range of values, declaring values, which represent upper and lower limits, and include all values that fall in between those values. In yet another example, a rule defining actions independent of domain, or to be applied to all domains may have a domain name parameter that is a wildcard. A wildcard may also be used with a combination of other characters. For example, defining nodename as "nt*" would include all node names that begin with "nt". An asterisk ("*") is a commonly used symbol to denote wildcard, however the invention should not be limited to this.

As mentioned above, one of the parameters of any rule could be the timestamp, which indicates the time when a rule is entered. Rules are added sequentially and must include a timestamp to ensure that they are applied in order. With the speed of computers, it is possible for several commands to be issued within the same second. Therefore, the data administration system may also add a unique key along with the timestamp so that the system can distinguish between different entries that occur at substantially the same time.

Listed below are several examples of commands issued by an administrator to the TSM System. The corresponding rules that result from the commands entered in a database table are shown as well, directly below the commands. It should be noted that the examples below are for illustration purposes to clearly demonstrate the present invention and must not be considered to limit the scope of the present invention.

1) enable event snmp severe, error nodename=nt*
2) enable event console all nodename=*
3) disable event console ans4000 nodename=*
4) disable event console ans4567 nodename=*
5) disable event console warning nodename=joe

| timestamp | id | domain | node | receiver | event | action |
|---|---|---|---|---|---|---|
| 03/17/1998 14:08:11 | 1 | | nt* | snmp | severe, error | enable |
| 03/17/1998 14:09:15 | 1 | | * | console | all | enable |
| 03/17/1998 14:22:51 | 1 | | * | console | ans4000 | disable |
| 03/17/1998 14:28:11 | 1 | | * | console | ans4567 | disable |
| 03/17/1998 14:28:52 | 1 | | joe | console | warning | disable |

Command 1 is an instruction to enable events classified as "severe" or "error" originating from client nodes whose names begin with "nt" to the snmp receiver. Command 2 is an instruction to enable all events from all node names to the console. Command 3 is an instruction to disable event messages named "ans4000" from all nodes to the console. Command 4 is an instruction so disable event message "ans4567" from all nodes to the console, and is shown in the table. Command 5 is an instruction to disable events classified as "warning" from client node "joe" to the console. These commands and resultant rules will be referred to later when further describing the process involved with rule removal in the present invention.

Now referring to FIG. 2, a flowchart illustrating a method for removing redundant rules from a database is shown. A system administrator issues a command creating a new rule in a database. A command may be issued, for example, from a console with data entry capabilities. The addition of the new rule to a database system following the issuance of the command is shown in block 204. Once the new rule has been added, its parameters are read and stored. Rules, both new and existing, have a plurality of parameters. These parameters include but are not limited to a timestamp, domain, node, receiver name, and an event.

Block 206 shows the introduction of a compare unit following the addition of a new rule. This compare unit may be implemented by hardware and/or software components which are capable of performing the compare unit functions.

The parameters of the new rule are passed to the compare unit. In one embodiment, the compare unit is a computer program. The compare unit initiates a background thread to compare the parameters of new rules with the parameters of existing rules in the database. A background thread is code that is capable of being executed behind the scenes without the users knowledge. While the background thread is executing, the user can continue executing other tasks concurrently in the foreground. The following embodiments discuss the functions of the compare unit as performed by software applications. However, it should be understood that the following embodiments may also be performed by hardware components or any combination of hardware and software components. The background thread in this embodiment allows for the continuation of foreground processes such as the processing of other administrative commands while the parameters are being compared. A step-by-step comparison of the parameters of the new rule with those of existing rules is performed. If the parameters of the new rule encompass those of an existing rule, the existing rule is considered redundant and is removed from the database. A parameter "encompasses" another parameter if it is either the same parameter, it is a superclass that contains the other parameter in its subclass, or it is wildcarded in such a way that the wildcard, if expanded, would include the other parameter.

In another embodiment, the parameter comparisons discussed above are performed in the foreground, with other administrative commands being processed after the compare unit completes its function. In yet another embodiment, the compare unit records newly entered rules in memory and waits to perform comparisons of parameters at specified times, such as off-peak hours.

Block 208 shows the step of reading database records. This begins the comparison process. Once the parameters of a new rule have been passed to the compare unit, it begins reading existing database records to determine if existing rules are encompassed by the new rule. Existing rules are read from the database and the parameters of the new rule are compared to those of the existing rules. In this embodiment, the compare unit is configured to read all existing rules in the database for comparison to the new rule. As mentioned before, rules are compared based upon the parameters in those rules. Examples of these parameters include but are not limited to timestamps, domain, nodes, receiver names, and event parameters. In another embodiment, parameters are compared in any order.

Block 210 represents the step of determining the precedence of the rules. One approach to determine the precedence of the rules is to use the timestamp in the situations where the rules have a timestamp as one of the parameters. In this situation, each rule in a database has a timestamp that indicates when it was entered. Because an existing rule must be earlier in time than a new rule, one approach of step 210 includes the comparison of the timestamps of the new rule and an existing rule to determine if the new rule is more recent than the existing rule it is being compared against. If the new rule does not have a later timestamp (or, conversely, if the existing rule is not earlier than the new rule), then the existing rule cannot be a candidate for removal. Thus, an existing rule can only be removed from the database if it has an earlier timestamp than the rule with which it is being compared. If an existing rule does have an earlier timestamp than the new rule it is being compared against, then the compare unit proceeds to check the other parameters of the new rule.

In situations where the timestamp is used to determine the precedence in step 210, the comparison of the timestamp parameter between an existing rule and a new rule also includes a comparison of an additional parameter that distinguishes between rules with the same timestamp. In an alternate embodiment, the first parameter comparison may compare any parameter to determine precedence. Thus, block 210 may compare any parameter that can be used to determine an order of precedence between an existing rule and a new rule. For example, a rule added by a supervisor may have precedence in a rules table over a rule added by a subordinate. Therefore, in such case, a timestamp is not an initial consideration in determining whether an existing rule is rendered redundant by a new rule.

Block 212 shows the step of comparing the parameters of the new rule with the old rule. In this step, each parameter of the new rule is compared with the corresponding parameter of the existing rule. If in each comparison step, the two parameters do not match, the existing rule is not a candidate for removal and the process goes back to step 208 for reading of the parameters of the next existing rule in the database.

For example in step 212, a comparison is done between a node of an existing rule and a domain name of the new rule. A node is a location or user within a domain, and a domain name is a collection of nodes. Therefore, a domain name includes at least one node. If a node in the existing rule is a member of the domain specified in the command for the new rule, then the existing rule remains a candidate for removal. Thus, in this embodiment, if a node of an existing rule is a member of the domain of a new rule, then a match exists and the compare unit can continue to check for matches between other parameters. If a node of an existing rule is not a member of a domain of a new rule, then the existing rule is not a candidate for removal and the next existing rule is read from the database.

In another embodiment, an existing rule can also be considered a candidate for removal during the step of block 212 if a domain name for the new rule encompasses the domain name for an existing rule. In an additional embodiment, an existing rule is a candidate for removal where a wildcard representing a node or domain name for the new rule encompasses a node or domain name for an existing rule.

The next parameter to compare could include the receiver names in new rule and the existing rule. Receiver names are destinations for events. Examples of receivers are a console, a file, a database, a user application, and an event management system. In this step, if a new rule contains a receiver name that encompasses the receiver name of an existing rule, the existing rule is a candidate for removal and the background thread continues comparing additional parameters. If, however, the receiver name of the new rule does not encompass the receiver name of an existing rule, the existing rule cannot be a candidate for removal and the next existing rule is read from the system. In another embodiment, a wildcard representing a receiver name of a new rule is also compared to an existing rule. If the wildcard representing the receiver name for the new rule encompasses the receiver name for an existing rule, the existing rule is a candidate for removal and the compare unit continues comparing other parameters.

The step 212 may also include determining whether an event of the new rule encompasses an event of an existing rule. Events are actions that take place in a system. An example of an event is the detection of data corruption when a file is read. If an event of a new rule encompasses an event of an existing rule, the existing rule remains a candidate for removal. However, since all parameters have now been compared in the process, events are only compared if all other parameters have produced a match. Therefore, if there is a match between events, then the existing rule is redundant and is removed from the database. This step is shown in block 216. In another embodiment, the step of block 212 compares whether an aggregate class of events, or special group or class of events, of the new rule encompasses an event of an existing rule. If so, the rule is a candidate for removal and is removed in the step of block 216. If not, the test of step 214 fails and the next database record containing an existing rule is read and the process repeated.

Referring back to block 214, it is determined whether the new rule encompasses the existing rule. If the new rule does not encompass the existing rule, the existing rule is not a candidate for removal and another existing rule is read from the database for comparison with the new rule. If the new rule encompasses the existing rule, the existing rule is a candidate for removal and the rule is removed in block 216. In still another embodiment, the step of block 216 compares whether a wildcard representing an event or aggregate class of the new rule encompasses an event of an existing rule. If so, the rule is a candidate for removal and is removed in the step of block 218. If not, the next database record containing an existing rule is read and the process repeated.

The step of removal of the rule as shown in block 216 is accomplished by either removing the rule from the rules table, or by removing its specific applicability in a system. When the utility or specific applicability of a rule is removed, the rule can be considered to have been disabled because it no longer has a function. Similarly, any rule removed from the rules table has also been disabled because it no longer exists in the rules table and no longer can be used. Thus, removing a rule may refer to either elimination of a rule from a system or to elimination of the utility of a rule in a system. There are many ways in which the utility of a rule may be eliminated. In one embodiment, a flag is added to an existing rule indicating that it has been disabled. A rule with a disabled flag indicates that such a rule should be skipped and therefore not consulted when a query is performed. In another embodiment, an existing rule that has been disabled may be taken from one rules table and placed in another rules table. In still another embodiment, a list of disabled existing rules may be created. Such a list would preserve all existing rules that have been disabled. In yet another embodiment, the rule is simply deleted from the rules table.

Referring back to commands 1 through 5 and resulting rules discussed in an earlier example, the following example illustrates the operation of the method for removing existing rules from a database or data administration system. In this example, a database contains existing rules relating to commands 1 through 5 which have been issued previously by an administrator:

It should be noted that command 1 was added to the rules table as two separate rules, one for severe events and one for error events. However, separate rules are not generated for every node name beginning with 'nt'. This allows for dynamic application of the rule to events classified as severe and error and for node names beginning with 'nt' at the time the rule is applied.

After issuing commands 1–5, the administrator issues the following command, which instructs the server to disable logging of all events from all nodes to the console. It should be noted that the term "all" in the command is treated like a wildcard, much like how asterisks are treated in other contexts.

disable event console all nodename=*

Following the issuance of this command, existing rules 2, 3, 4 and 5 will be removed from the table. Since this new command instructs the server to disable ALL console events, there is no need to keep existing rules 3, 4 and 5 which all instruct the server to disable specific instances of console events. Also, rule 2 is removed since the new command is issuing a different action for identical criteria. This is because the node name, receiver name, and event of the new rule encompass the nodes, receiver names, and events of rules 2, 3, 4 and 5.

In another example, using the same 5 existing rules from above, the administrator issues command:

disable event console all domain=dept67k

In this command, domain 'dept67k' included nodes, fred, joe, and don. Following the issuance of this command, existing rule 5 becomes redundant and will be removed from the table. This is because the 'nodename=joe' element of existing rule 5 is encompassed by the domain of the new rule. Also, the receiver name and event of the existing rule match the new rule. Therefore, all parameters meet the test for redundancy and existing rule 5 is removed.

Figure 3:
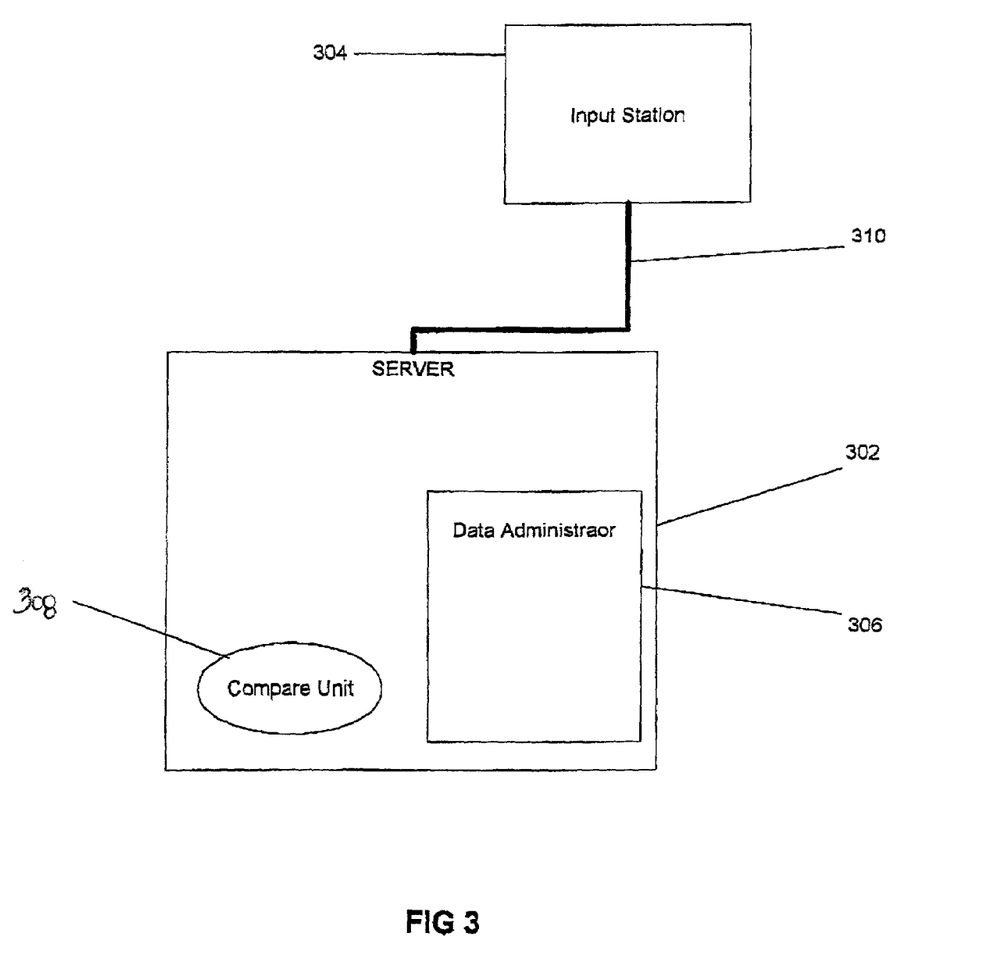
FIG. 3 is a schematic of a system for performing the present invention.

FIG. 3 shows an overview of the system or apparatus for removing redundant rules from a data administration system. The system of FIG. 3 includes a server 302, a data entry or an input station 304 that communicates with server 302 via network connection 310, a data administrator 306 (such as IBM® TSM), and a compare unit 308. The data entry device 304 is used by an administrator to enter rules that are used by the storage manager 306. In one embodiment, the present invention resides in the data administrator and calls upon the compare unit 308 to perform the tasks needed by the present invention as described above. The data entry device 304 may be any device that is used by an administrator to enter commands into a system. Examples of such devices include but are not limited to personal computers and workstations.

The compare unit 308 may include any hardware and/or software components commonly used to perform specific functions. The compare unit is used to compare parameters of exiting rules with parameters of new rules entered using the data entry device 304. An example of software capable of performing parameter comparisons is a computer program configured to carry out the functions of the compare unit. In one embodiment, the computer program includes a background thread. When new rules are entered in the system, the data administrator 306 calls upon the compare unit to compare the existing rules and new rules and disables or removes existing rules encompassed by new rules.

The foregoing description of the preferred embodiments of the invention have been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computer based method of eliminating redundant rules from a data administration system comprising the steps of:

receiving a new rule having a timestamp parameter;
comparing the timestamp parameter of the new rule with a timestamp parameter of an existing rule;
determining if the timestamp parameter of the new rule is later than the timestamp parameter of the existing rule;
and if not so,
　terminating comparing the new rule to the existing rule;
and if so,
　comparing at least one additional parameter of the new rule with a corresponding parameter of the existing rule in said data administration system; and
　eliminating the existing rule if the new rule encompasses the existing rule.

2. The method of claim 1, wherein the new rule encompasses the existing rule if the at least one additional parameter of the new rule encompasses the corresponding parameter of the existing rule.

3. The method of claim 1, wherein the new rule encompasses the existing rule when the at least one additional parameter of the new rule matches the corresponding parameter of the existing rule.

4. The method of claim 1, wherein the new rule encompasses the existing rule when the at least one additional parameter of the new rule defines a class of parameters that includes the corresponding parameter of the existing rule.

5. The method of claim 1, wherein said at least one additional parameter includes one of a node name, domain name, receiver name, event name, or event type.

6. The method of claim 1, wherein the method further comprises logging an event indicating a database inconstancy if the timestamp parameter of the new rule is not later than the timestamp parameter of the existing rule.

7. The method of claim 1, wherein the at least one additional parameter of the new rule includes each additional parameter of the new rule, and wherein the method further comprises:
　comparing the timestamp parameter of the new rule with a timestamp parameter of an additional existing rule;
　determining if the timestamp parameter of the new rule is later than the timestamp parameter of the additional existing rule;
　and if not so,
　　terminating comparing the new rule to the additional existing rule;
　and if so,
　　comparing each additional parameter of the new rule with a corresponding parameter of the additional existing rule in said data administration system; and
　　eliminating the additional existing rule if each additional parameter of the new rule encompasses a corresponding parameter of the additional existing rule.

8. The method of claim 7, wherein the method further comprises including a unigue key with each timestamp parameter so the system can distinguish between entries that occur at substantially the same time.

9. The method of claim 1, wherein the step of eliminating the existing rule includes the step of removing the existing rule from the data administration system.

10. The method of claim 1, wherein the step of eliminating the existing rule includes the step of flagging said rule so that it is ignored by the data administration system.

11. The method of claim 1, wherein the step of eliminating the existing rule includes the step of moving said rule to a table so said rule is ignored by the data administration system.

12. The method of claim 1, wherein the new rule encompasses the existing rule if the at least one additional parameter of the new rule has a wildcard character, and the at least one additional parameter of the new rule having the wildcard character includes the corresponding parameter of the existing rule.

13. In a computing system, a method of eliminating a redundant rule from a data administration system comprising the steps of:
　receiving a new rule having a plurality of parameters including a parameter that indicates whether the new rule was added by an administrator;
　reading and storing the plurality of parameters of the new rule;
　comparing the parameter that indicates whether the new rule was added by the administrator, with a corresponding parameter of an existing rule;
　determining if, both, the new rule was added by the administrator and the existing rule was added by a subordinate;
　and if not so,
　　terminating comparing the new rule to the existing rule;
　and if so,
　　comparing the at least one additional parameter of the new rule with a corresponding parameter of the existing rule in said data administration system; and
　　eliminating the existing rule if the at least one additional parameter of the new rule encompasses the corresponding parameter of the existing rule.

14. The method of claim 13, wherein the at least one additional parameter of the new rule encompasses the corresponding parameter of the existing rule if the at least one additional parameter of the new rule matches the corresponding parameter of the existing rule.

15. The method of claim 13, wherein the at least one additional parameter of the new rule encompasses the corresponding parameter of the existing rule if the at least one additional parameter of the new rule defines a class of parameters that includes the corresponding parameter of the existing rule.

16. The method of claim 13, wherein said at least one additional parameter includes one of a timestamp, node name, domain name, receiver name, event name, or event type.

17. The method of claim 13, wherein the method further comprises logging an event indicating a database inconsistency if the new rule was added by the subordinate and the existing rule was added by the administrator.

18. The method of claim 13, wherein the new rule encompasses the existing rule if the at least one additional parameter of the new rule has a wildcard character, and the at least one additional parameter of the new rule having the wildcard character includes the corresponding parameter of the existing rule.

19. The method of claim 13, wherein the method further comprises:
　comparing the parameter that indicates whether the new rule was added by the administrator, with a corresponding parameter of an additional existing rule;
　determining if, both, the new rule was added by the administrator and the additional existing rule was not added by the administrator;
　and if not so,
　　terminating comparing the new rule to the additional existing rule;
　and if so, comparing at least one additional parameter of the new rule with a corresponding parameter of the additional existing rule in said data administration system; and eliminating the additional existing rule if the at least one additional parameter of the new rule encompasses the corresponding parameter of the additional existing rule.

20. The method of claim 13, wherein the step of eliminating the existing rule includes the step of removing the existing rule from the data administration system.

21. The method of claim 13, wherein the step of eliminating the existing rule includes the step of flagging said rule so that it is ignored by the data administration system.

22. The method of claim 13, wherein the step of eliminating the existing rule includes the step of moving said rule to a table so said rule is ignored by the data administration system.

23. An apparatus for eliminating redundant rules from a data administration system comprising:
   a) an entry device for entering a new rule having a timestamp parameter, into the data administration system; and
   b) a compare unit for comparing the new rule with an existing rule and eliminating the existing rule if the new rule encompasses the existing rule, wherein the compare unit is configured to perform the following operations:
   comparing the timestamp parameter of the new rule with a timestamp parameter of the existing rule;
   determining if the timestamp parameter of the new rule is later than the timestamp parameter of the existing rule; and if not so,
      terminating comparing the new rule to the existing rule;
   and if so,
      comparing at least one additional parameter of the new rule with a corresponding parameter of the existing rule in said data administration system; and
      eliminating the existing rule if the at least one additional parameter of the new rule encompasses the corresponding parameter of the existing rule.

24. The apparatus of claim 23, wherein the operations further comprise:
   comparing the timestamp parameter of the new rule with a timestamp parameter of an additional existing rule;
   determining if the timestamp parameter of the new rule is later than the timestamp parameter of the additional existing rule; and if not so,
      terminating comparing the new rule to the additional existing rule;
   and if so,
      comparing at least one additional parameter of the new rule with a corresponding parameter of the additional existing rule in said data administration system; and
      eliminating the additional existing rule if the new rule encompasses the additional existing rule.

25. The apparatus of claim 24, wherein the at least one additional parameter of the new rule encompasses the corresponding parameter of the existing rule if the at least one additional parameter of the new rule matches the corresponding parameter of the existing rule.

26. The apparatus of claim 24, wherein the at least one additional parameter of the new rule encompasses the corresponding parameter of the existing rule if the at least one additional parameter of the new rule defines a class of parameters that includes the corresponding parameter of the existing rule.

27. The apparatus of claim 24, wherein said at least one additional parameter of the new rule includes one of a node name, domain name, receiver name, event name, or event type.

28. The apparatus of claim 24, wherein the operations further comprise including a unique key with each timestamp parameter so the system can distinguish between entries that occur at substantially the same time.

29. The apparatus of claim 28, wherein the additional existing rule is a next rule in a database after the existing rule.

30. The apparatus of claim 28, wherein the operations further comprise logging an event indicating a database inconstancy if the timestamp parameter of the new rule is not later than the timestamp parameter of the existing rule.

31. The apparatus of claim 30, wherein eliminating the existing rule includes the removal of the existing rule from the data administration system.

32. The apparatus of claim 30, wherein eliminating the existing rule includes flagging the existing rule so that it is ignored by the data administration system.

33. The apparatus of claim 30, wherein the step of eliminating the existing rule includes the step of moving said rule to a table so said rule is ignored by the data administration system.

34. The apparatus of claim 23 wherein the at least one additional parameter of the new rule includes each additional parameter of the new rule.

35. A computing system for eliminating redundant rules from a data administration system comprising:
   means for entering a new rule into the data administration system, the new rule including at least one parameter, and wherein the at least one parameter includes a timestamp parameter;
   means for comparing the new rule with an existing rule having a timestamp parameter, wherein the means for comparing is configured to perform the following operations:
   comparing the timestamp parameter of the new rule with the timestamp parameter of the existing rule;
   determining if the timestamp parameter of the new rule is later than the timestamp parameter of the existing rule; and if not so,
      terminating comparing the new rule to the existing rule;
   and if so,
      comparing at least one additional parameter of the new rule with a corresponding parameter of the existing rule in said data administration system; and
      eliminating the existing rule if the new rule encompasses the existing rule, wherein the new rule encompasses the existing rule if the at least one additional parameter of the new rule encompasses the corresponding parameter of the existing rule.

36. The system of claim 35, wherein the at least one additional parameter of the new rule encompasses the corresponding parameter of the existing rule when the at least one additional parameter of the new rule matches the corresponding parameter of the existing rule.

37. The system of claim 35, wherein the at least one additional parameter of the new rule encompasses the corresponding parameter of the existing rule when the at least one additional parameter of the new rule defines a class of parameters that includes the parameter of the existing rule.

38. The system of claim 35, wherein a unique key is included with each timestamp parameter so the means for comparing can distinguish between entries that occur at substantially the same time.

39. The system of claim 38, wherein the operations further comprise:
comparing the timestamp parameter of the new rule with a timestamp parameter of an additional existing rule;
determining if the timestamp parameter of the new rule is later than the timestamp parameter of the additional existing rule;
and if not so,
terminating comparing the new rule to the additional existing rule;
and if so,
comparing at least one additional parameter of the new rule with a corresponding parameter of the additional existing rule in said data administration system; and
eliminating the additional existing rule if the new rule encompasses the additional existing rule.

40. The system of claim 35, wherein said at least one parameter of the new rule includes one of a node name, domain name, receiver name, or event type.

41. The system of claim 35, wherein the operations further comprise logging an event indicating a database inconstancy if the timestamp parameter of the new rule is not later than the timestamp parameter of the existing rule.

42. The system of claim 35, wherein eliminating the existing rule includes the removal of the existing rule from the data administration system.

43. The system of claim 35, wherein eliminating the existing rule includes the flagging of said rule so that it is ignored by the data administration system.

44. The system of claim 35, wherein the step of eliminating the existing rule includes the step of moving said rule to a table so said rule is ignored by the data administration system.

45. The system of claim 35, wherein the compare unit is configured to eliminate an existing rule from the data administration system if it is a member of a group for which a new rule is being added.

46. The system of claim 35, wherein the at least one additional parameter of the new rule encompasses the corresponding parameter of the existing rule if the at least one additional parameter of the new rule has a wildcard character, and the at least one additional parameter of the new rule having the wildcard character includes the corresponding parameter of the existing rule.

47. A computer based method for eliminating redundant rules from a data administration system, the method comprising:
entering a new rule into the data administration system, the new rule including a plurality of parameters, wherein the plurality of parameters include a timestamp parameter; and
passing the plurality of parameters of the new rule to a compare unit, wherein the compare unit is configured to perform the following operations:
comparing the timestamp parameter of the new rule with a timestamp parameter of a first existing rule having a plurality of parameters;
determining if the timestamp parameter of the new rule is later than the timestamp parameter of the first existing rule;
and if not so,
terminating comparing the new rule;
and if so,
comparing each additional parameter of the new rule with a corresponding parameter in the plurality of parameters of the first existing rule in said data administration system;
eliminating the first existing rule if the new rule encompasses the first existing rule, wherein the new rule encompasses the first existing rule if each additional parameter of the new rule encompasses the corresponding parameter of the first existing rule; and
determining if the timestamp parameter of the new rule is later than the timestamp parameter of a second existing rule;
and if not so,
terminating comparing the new rule;
and if so,
comparing each additional parameter of the new rule with a corresponding parameter of the second existing rule in said data administration system; and
eliminating the second existing rule if the new rule encompasses the second existing rule, wherein the new rule encompasses the second existing rule if each additional parameter of the new rule encompasses the corresponding parameter of the second existing rule.

48. The method of claim 47, wherein each of the parameters of the new rule encompasses the corresponding one of the plurality of parameters of the first existing rule when each of the parameters of the new rule matches the corresponding one of the parameters of the first existing rule.

49. The method of claim 47, wherein each of the parameters of the new rule encompasses the corresponding one of the plurality of parameters of the first existing rule when each of the parameters of the new rule defines a class of parameters that includes the corresponding one of the plurality of parameters of the first existing rule.

50. The method of claim 47, wherein the method further comprises logging an event indicating a database inconstancy if the timestamp parameter of the new rule is not later than the timestamp parameter of the first existing rule.

51. The method of claim 50, wherein the method further comprises including a unique key with each timestamp parameter so the system can distinguish between entries that occur at substantially the same time.

52. The method of claim 47, wherein the step of eliminating the first existing rule includes the step of removing the first existing rule from the data administration system.

53. The method of claim 47, wherein the step of eliminating the first existing rule includes the step of flagging the first existing rule so that it is ignored by the data administration system.

54. The method of claim 47, wherein the step of eliminating the first existing rule includes the step of moving said first existing rule to a table so said first existing rule is ignored by the data administration system.

55. A method of eliminating redundant rules from a data administration system comprising the steps of:
receiving a new rule having a timestamp parameter;
comparing the timestamp parameter of the new rule with a timestamp parameter of an existing rule;
determining if the timestamp parameter of the new rule is later than the timestamp parameter of the existing rule;
and if not so, terminating comparing the new rule to the existing rule;
and if so,
comparing at least one additional parameter of the new rule with a corresponding parameter of the existing rule in said data administration system; and eliminating the existing rule if the new rule encompasses the existing rule, wherein the new rule encompasses the existing rule if the at least one additional parameter of the new rule encompasses the corresponding parameter of the existing rule.

* * * * *